INVENTOR.
HARLAN V. WHITE
BY
Harry C. Burgess
ATTORNEY

Fig 3

United States Patent Office 3,166,903
Patented Jan. 26, 1965

3,166,903
JET ENGINE STRUCTURE
Harlan V. White, Schenectady, N.Y., assignor to General
Electric Company, a corporation of New York
Filed Apr. 4, 1962, Ser. No. 185,778
1 Claim. (Cl. 60—39.31)

This invention relates to jet engine structure and, more specifically, to a lightweight, load bearing frame structure for use in an axial-flow jet engine including improved means for converting distributed loads to concentrated loads.

It has become increasingly important in the design of jet engines, particularly gas turbine engines for aircraft, to provide engines which are light in weight. However, when engine components are made from thin-walled, sheet-metal materials, particularly the structural or frame components, unwanted stress concentrations may be introduced. For example, it is sometimes desirable to control the velocity of the exhaust gas stream issuing from the tailpipe of an axial-flow jet engine by means of a variable-area nozzle. One known type of nozzle for such an engine utilizes a centrally-located plug. The plug, being axisymmetric, may be supported by a cylindrical member integrated in some manner with the main engine structural components or frames. One problem that arises is how to efficiently transition the loads which are imposed on the axially-extending plug by the gas stream to the radially-extending frame members. In other words, what may be described as an essentially uniform, distributed axial load in the cylindrical member must be transformed into a shear load. Also, and what is more difficult, where a plurality of radially-extending frame members or struts are used, the *distributed* axial load must be transmitted as *distributed* shear into the strut walls, which necessarily results in concentrated axial loads in the cylindrical member.

Accordingly, the primary object of the present invention is to provide an improved load distributing frame structure for use in a lightweight axial-flow jet engine.

In the described embodiment, the invention comprises means for taking a distributed, essentially uniform axial load in a substantially cylindrical support member and transmitting the load into a plurality of radially-extending struts intersecting the member, at the same time avoiding curved load paths.

Figure 1:
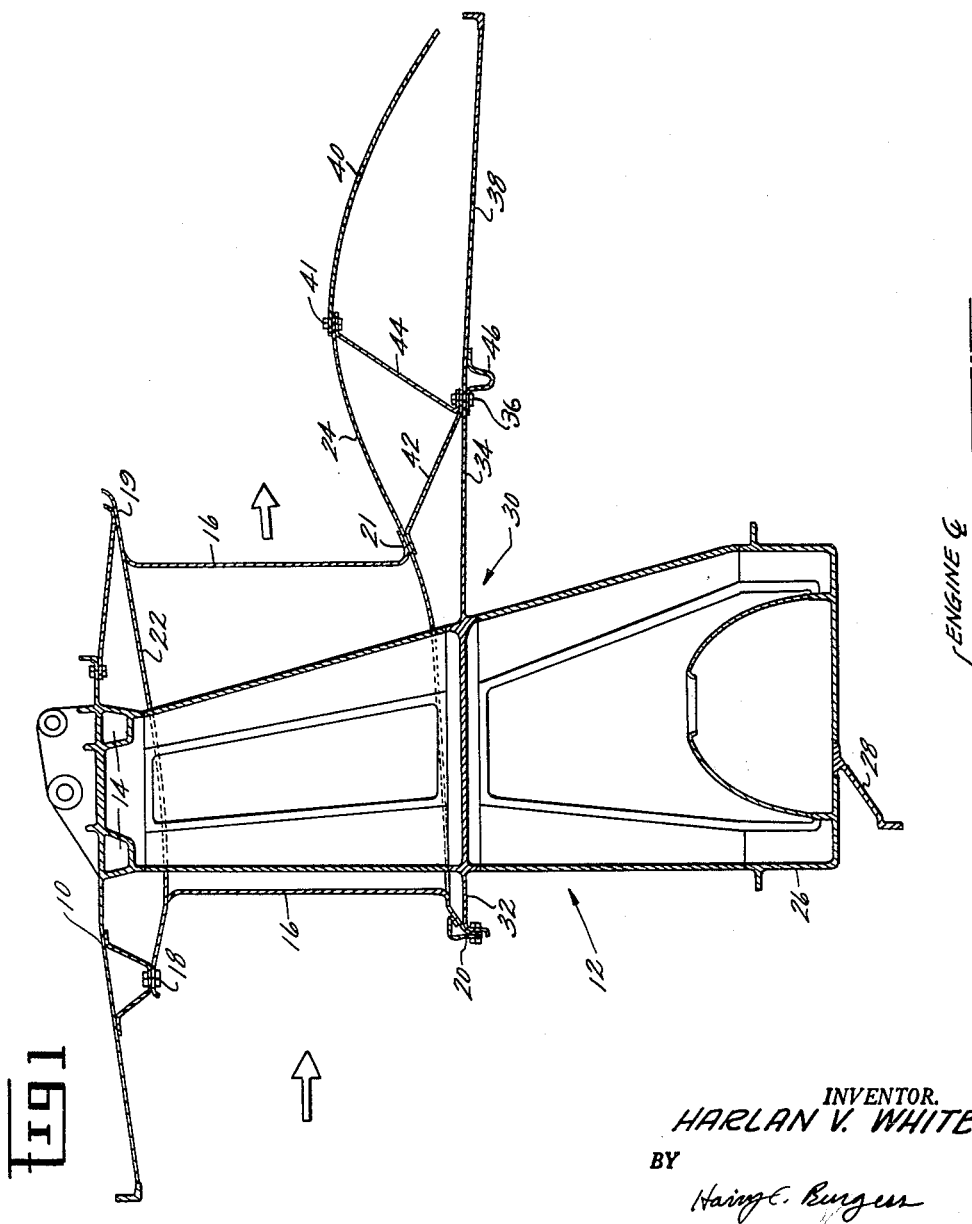
Figure 2:
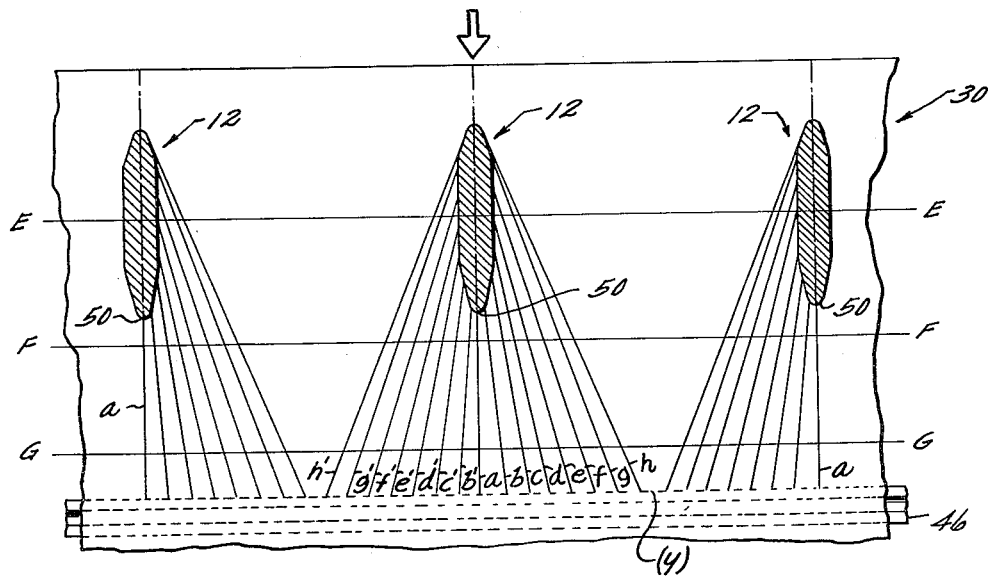
Figure 4:
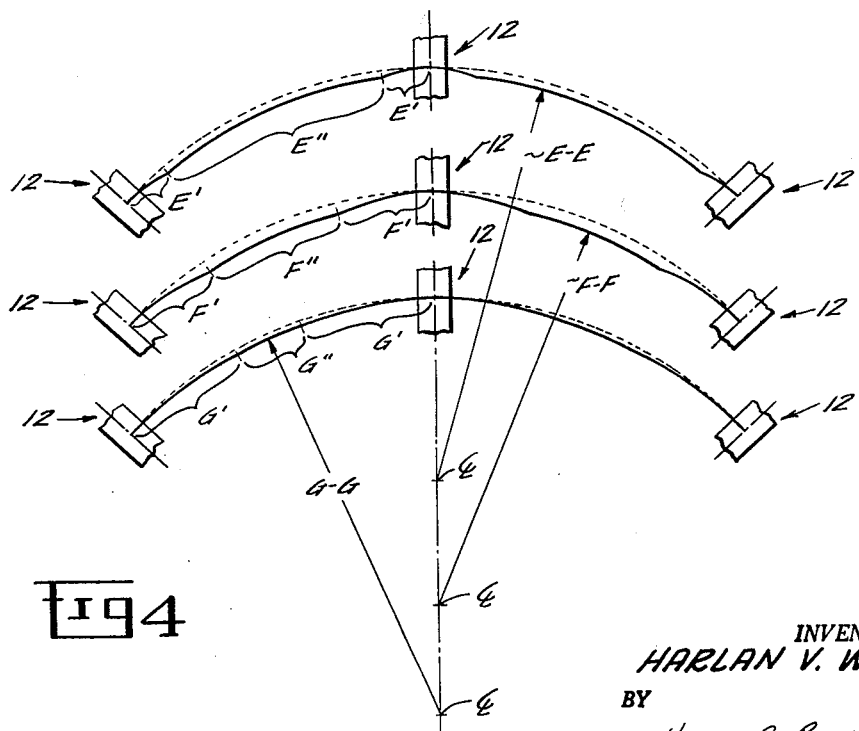

Although the invention is particularly pointed out and distinctly claimed at the end of the following detailed description, the invention will perhaps be better understood and other objects and advantages become more readily apparent when the description is read in conjunction with the following drawings in which:

FIGURE 1 is a side view, partially in cross section, of a lightweight frame member in an axial-flow jet engine embodying the invention; and FIGURES 2, 3 and 4 are schematic drawings illustrating the manner in which the invention enables loads to be more efficiently transmitted from a cylindrical support member to a plurality of radial-extending frame members.

Turning now more specifically to the drawings, FIGURE 1 is a sectional view of a frame member, e.g., a rear turbine frame in an axial-flow jet engine utilizing the invention. It will be understood that while the rear turbine frame is shown for purposes of illustration, the invention is not limited to this portion of the engine and may find equal application elsewhere. In the drawing, numeral 10 is an outer casing or shell which forms a duct for the main jet exhaust flow indicated by the large arrows. The flow comes from the turbine section (not shown) which is located upstream of a plurality of radially-extending supporting members or struts, one of which is indicated generally at 12. The strut may be integral with the outer casing, or it may be welded thereto, and may also include stiffeners in the form of channels or rings 14—14 located at the outer end of the strut. The strut preferably is provided with a heat shield or baffle 16 attached, by suitable means, at 18, 19, 20 and 21 to the outer casing and the central portion of the strut. Generally conical, lightweight, sheet-metal components 22 and 24 are also provided which, when welded or otherwise permanently attached to the heat shield, form an annular opening for the hot exhaust gas jet. Adapted to be located at the inner end 26 of the strut is a bearing (not shown) for the turbine rotor, the bearing being supported in a known manner from the conical member 28. The struct 12 is preferably hollow, being fabricated from lightweight sheet-metal or, as shown, comprising a lightweight casting. Bisecting the strut is a substantially cylindrical member indicated generally at 30, which extends slightly forward of the strut 12, at 32, and aft thereof, at 34. While hereinafter referred to as a "cylinder," it will become apparent that pursuant to the teachings of my invention the support member 30 is not, in fact, a perfectly circular cylinder. In the embodiment shown, the cylindrical member 30 is attached at 36 to a support member 38 for a plug 40 acted upon by the exhaust gases issuing from the engine. As seen in the drawings, the plug is a continuation of the inner flow defining wall member 24, being attached thereto at 41. Internal reinforcing members 42 and 44 are provided to maintain rigidity in the structure. In addition, a reinforcing ring 46 is provided adjacent the downstream edge of the cylindrical member 30 for a purpose hereafter described in more detail.

To better describe the invention, use has been made of schematic type drawings. FIGURE 2 illustrates the substantially cylindrical member 30 as if rolled out into a plane. Accordingly, the struts 12 are depicted as intersecting the plane at right angles thereto. As stated above, the present invention has to do with the means by which the substantially uniform or *distributed axial* load, introduced in the cylindrical member 30 by forces acting on the plug and supporting structure, is transmitted to the struts 12 as *concentrated axial*, i.e., distributed shear loads. Assuming gas flow to be in the direction of the arrow in FIGURE 2, at the first instant that the load is applied, i.e., exhaust gas flow occurs, most, if not all, of the load will be applied to the downstream tip 50 of the strut, or where the strut intersects the cylindrical load bearing member 30. This is so since, obviously, the shortest distance between a point on the strut-to-cylinder intersection line and a reference area (ring 46) downstream in the "plane" 30 is represented by line $a$ in the plane. Stress will thus be concentrated in the cylinder and would remain concentrated far downstream of the strut tip in the conventional construction. However, the invention eliminates this unwanted stress concentration and does so in a comparatively short axial distance, the latter feature being especially desirable in the construction of large diameter, lightweight engines.

To explain, assume that in addition to distance $a$, an infinite number of distances, or elements, are laid out in the "plane," i.e., in the cylinder 30. These elements may be represented by "straight lines" $b$ through $h$ and $b'$ through $h'$, on either side of element $a$, which connect the strut-to-cylinder intersection with a reference line (ring 46) in the "plane" 30. In other words, these so-called "straight line" elements may be visualized as an infinite number of strings stretched between two points, one point being on the strut wall approximately half-way between the ends of the strut, and the other point being on the cylindrical member in the vicinity of the circumferential stiffening ring 46. In the schematic of FIGURE 2 the above-described arrangement has the appearance of a number of triangular shaped areas fanning out from the strut and coming together adajacent the stiffener ring. The "straight line" elements in these areas act to equalize load distribution by equalizing the stiffness of the load paths, i.e., these paths are now straight, rather than curved, extending from an infinite number of zones along the strut periphery to the desired zone of the cylindrical support member 30.

The concept may perhaps be more clearly understood if resort is made to the device of passing an imaginary plane through one of the "straight-line" elements, e.g., $h$, the plane containing element $h$ of the cylinder structure (wall) and being pierced by the engine centerline. Such a plane ABCD is shown in FIGURE 3. From the drawing it will be clear that without element $h$, the intersection of the plane and the cylinder structure would be the curved (dotted) line. However, when the construction disclosed by the invention is utilized, the cylinder wall at the point of intersection takes the form of the "straight line" $h$ between the points $(x)$ and $(y)$ on the strut and at the location of stiffening ring 46, respectively. Obviously, if a tensile load were then applied at point $(y)$, i.e., to the ring 46, this load would be immediately applied to point $(x)$, whereas if element $h$ were not provided, that is, if the part of the wall of member 30 in the plane ABCD were, in fact, cylindrical (curved) rather than the straight line element, as herein defined, the curved load path in the cylinder wall (dotted line in FIG. 3) would first tend to flatten out before tension could be transmitted to point $(x)$. Thus, throughout the infinite number of "straight line elements," represented in FIGURE 2 by lines $b-h$ and $b'-h'$, and $a$, representing the traces of a family of planes passed through the wall of member 30 the axial loads at the stiffener ring are immediately and uniformly distributed along the strut-to-cylinder connections.

In actual practice, the described arrangement results in a cylinder configuration perhaps best illustrated with the help of FIGURE 4. Assume a series of planes E—E, F—F, G—G, as shown in FIGURE 2, passed through the cylinder 30 and perpendicular to the engine axis. In FIGURE 4, the dotted lines represent the original diameter of the cylinder, i.e., the diameter that exists at the ring 46 and adjacent the baffle connection at 20, in FIGURE 1. Consider first, plane F—F. Each portion of the actual wall indicated at F' will be curving inwardly towards the engine axis, the curve being of a continually changing radius moving outwardly from the strut centerline. Intermediate the two continually changing portions is a central portion F'' which represents the portion of the support member 30 between the adjacent areas containing the "straight-line" elements. In contrast to portions F', these central portions F'' do have a radius which is unique for each point through which is passed a plane perpendicular to the engine axis (such as plane F—F), this radius being concentric to the engine axis. Thus, it will be clear that at some point along the wall of the substantially cylindrical member 30 between the connection at 20 and the ring 46 a "low" point, or smallest concentric radius will exist and that on both sides of these intermediate cylindrical portions there exist portions of the cylinder of continuously changing curvature extending on out to the strut peripheries. Similarly, the planes E—E and G—G will delineate portions of the actual structure (wall) of support member 30 (E' and E'', and G' and G'') which will be either of continually changing radii or of a single radius concentric to the original cylinder radius.

The lateral and longitudinal extent of each of the continuously curving areas of "straight line" elements, as viewed in FIGURES 2 and 4, will depend, respectively, on (1) the number, spacing, and thickness of the struts 12, and (2) the axial length of each strut and the axial distance in which it is desired to accomplish the load equalization (in this case, the distance indicated at 34 in FIGURE 1), i.e., the transmitting of the distributed axial loads to distributed shear loads at each strut.

It should be realized that a completely uniform load distribution at the area of the ring 46 is not possible for several reasons. For example, the walls of the struts 12 will not be of completely uniform stiffness so that some "straight line" elements may pull more than others. Also, the ring 46 will have some radial and circumferential loads induced on it due to the angle of approach of the "straight line" elements, which cause some deflection that will further militate against complete uniformity of distribution of the axial loads. Nevertheless, it has been found that by utilizing the invention, less than 20% deviation from the uniform, at the ring, may be achieved.

The above-described arrangement will therefore be seen to differ from the conventional jet engine frame construction which typically has required one or more of the following: (1) long (axial) sections to take out the loads, with or without thickness variation in the cylinder wall itself, (2) the addition of very heavy rings at the leading and trailing edges of the struts, (3) use of a multiplicity of circumferential rings in the transition zone (e.g., zone 34 in FIGURE 1), and (4) longerons extending far downstream of the struts.

While perhaps best suited for structures within the induced side loads, i.e., loads acting perpendicular to the engine axis, are not excessive, with the addition of small, lightweight, sheet-metal channels in the plane of the struts, the above-described invention will provide a lighter structure than heretofore known and, moreover, an improved arrangement for transmitting uniformly distributed axial loads to a frame as distributed shear (concentrated axial) loads.

While I have described my invention as being useful in the embodiment shown, it should be understood that it will have application in other structures where loads are present and therefore the claim which follows should not be taken as being limited thereto.

What I claim is:

In a fluid flow engine a lightweight supporting structure including a frame, said frame having:
  inner and outer motive fluid flow-defining wall portions;
  a plurality of circumferentially-arranged, radially extending struts joining said inner and outer wall portions and providing support thereto;
  a substantially cylindrical sheet metal support member located generally within said inner wall portion, said support member being intersected by said struts adjacent one end of said support member;
  and a flow guiding member connected to said support member at the other end thereof, said motive fluid acting on said flow guiding member so as to impose a substantially uniformly distributed axial load about said other end of said substantially cylindrical support member;
  said support member having a plurality of discrete, generally triangular-shaped, wall portions, said triangular-shaped wall portions extending longitudinally of the support member from the upstream extremity of the strut to said other end of said support member, and laterally of the strut along the support member from a minimum distance at said upstream strut extremity to a maximum distance at the other end of said support member so that the bases of said triangular-shaped wall portions join at said other end,
  each of said triangular-shaped wall portions being comprised of the traces of a family of skewed planes passing through said support member wall, each plane being intersected by the axis of said support member but not containing said axis with the exception of a single plane central to each of said wall portions located at the downstream extremity of said strut, said traces representing straight line elements of said support member wall extending from the strut intersection therewith to said other end of said member, said elements substantially uniformly reacting to said distributed axial load in a manner such as to transmit said load to said struts with the avoidance of curved load paths in said support member.

References Cited in the file of this patent

UNITED STATES PATENTS 3,050,937     James et al.     Aug. 28, 1962

FOREIGN PATENTS 1,078,878     Germany     Mar. 31, 1960